US006302423B1

(12) United States Patent
Alexander

(10) Patent No.: US 6,302,423 B1
(45) Date of Patent: Oct. 16, 2001

(54) METHOD AND APPARATUS FOR MODIFYING A TRUCK WITH A FIFTH WHEEL

(76) Inventor: Kevin R. Alexander, 1396 220th St., Sergeant Bluff, IA (US) 51054

( * ) Notice: Subject to any disclaimer, the term of this patent is extended or adjusted under 35 U.S.C. 154(b) by 0 days.

(21) Appl. No.: 09/542,654

(22) Filed: Apr. 4, 2000

(51) Int. Cl.[7] ........................................................ B60F 5/00
(52) U.S. Cl. ...................... 280/415.1; 296/35.3; 239/661
(58) Field of Search ................................ 280/433, 415.1, 280/416.1, 418.1; 296/35.1, 35.3; 298/24; 222/608, 609, 610; 239/650, 661, 663

(56) References Cited

U.S. PATENT DOCUMENTS

| 4,000,924 | * | 1/1977 | Blasingame | 296/35 |
| 4,078,818 | * | 3/1978 | Donnelly | 280/415 B |
| 4,456,414 | * | 6/1984 | Williams | 410/80 |
| 4,662,670 | * | 5/1987 | Kemner | 296/35.3 |
| 4,702,510 | * | 10/1987 | Davis | 296/35.3 |
| 4,767,063 | * | 8/1988 | Wall et al. | 239/672 |
| 4,969,690 | * | 11/1990 | Smith | 298/17 R |
| 5,765,849 | | 6/1998 | Moulton et al. | |
| 5,785,485 | * | 7/1998 | Hall | 414/498 |
| 6,036,428 | * | 3/2000 | Kooima | 414/563 |

FOREIGN PATENT DOCUMENTS

4222627 * 5/1993 (DE) .

* cited by examiner

Primary Examiner—Brian L. Johnson
Assistant Examiner—Daniel Yeagley
(74) Attorney, Agent, or Firm—Rankin, Hill, Porter & Clark LLP

(57) ABSTRACT

A method and apparatus for modifying a truck with a fifth wheel to carry a device, such as a sander. A mounting structure is provided having a pair of spaced-apart brackets, each of which includes a pair of mounting plates secured to opposing end portions of a girder. A pair of bars are secured between the girders to form a substantially rectangular frame that extends around and above the fifth wheel. Upper surfaces of the bars are disposed above the fifth wheel. The device is supported on the upper surfaces of the mounting structure, above the fifth wheel.

18 Claims, 3 Drawing Sheets

METHOD AND APPARATUS FOR MODIFYING A TRUCK WITH A FIFTH WHEEL

BACKGROUND OF THE INVENTION

1. Field of the Invention

This invention relates to trucks in general and, more particularly, to methods and apparatus for modifying a truck with a fifth wheel.

2. Description of Related Art

As is commonly known, a tractor trailer is an articulated truck having a powered tractor or truck pivotably connected to a trailer for holding goods. The truck includes a chassis supported on front and rear wheels respectively mounted to a front axle and one or two rear axles. A cab for housing a driver is mounted on the chassis, as is a large diesel engine for powering the truck. Typically, a lockable latching mechanism called a "fifth wheel" is mounted to the chassis so as to be positioned above the rear wheels. The fifth wheel usually includes a large top plate pivotably connected to a base plate secured to the chassis. The top plate is generally horseshoe-shaped and includes a center slot or throat for receiving a downwardly-extending kingpin of a trailer.

Due to the heavy loads they must pull, trucks are large and expensive pieces' of equipment. Since a truck represent a large capital investment, it is desirable to use a truck in as efficient a manner as possible. The efficiency with which a truck can be utilized, however, is currently limited because a truck is typically used only to pull a trailer due to the presence of the fifth wheel.

Based on the foregoing it would be desirable to provide a method and apparatus for more efficiently using a truck with a fifth wheel. The present invention is directed to such a method and apparatus.

SUMMARY OF THE INVENTION

It therefore would be desirable, and is an advantage of the present invention, to provide a mounting structure for supporting a device above a fifth wheel on a chassis of a truck. The mounting structure includes a pair of spaced-apart brackets. Each of the brackets includes a pair of mounting plates secured to opposing end portions of a girder or I-beam. The mounting plates each have an attachment portion extending at a substantially right angle from the girder. The attachment portion is adapted for mounting to opposing side walls of the chassis. The girders each have a height at least as high as the fifth wheel. A pair of bars are also provided. Each of the bars has an end portion secured to the girder of one of the brackets and an opposing end portion secured to the girder of the other one of the brackets. The bars are secured to the brackets such that the brackets and the bars form a frame adapted to extend around and above the fifth wheel.

Also provided in accordance with the present invention is a truck having a cab mounted to a chassis. A fifth wheel is mounted to the chassis, rearward of the cab. A mounting structure is secured to the chassis. The mounting structure has an upper surface disposed at least as high as the top of the fifth wheel, and a pair of brackets are disposed on opposing sides of the fifth wheel. A device is at least partially supported on the upper surface of the mounting structure, above the fifth wheel.

Also provided in accordance with the present invention is a method of modifying a truck having a chassis with a fifth wheel mounted thereto. In accordance with the method, a mounting structure is provided having an upper surface and a pair of brackets. A device to be carried by the truck is also provided. The mounting structure is secured to the chassis of the truck such that the fifth wheel is disposed between the brackets and the upper surface is disposed at least as high as the top of the fifth wheel. The device is placed on the mounting structure such that the device is at least partially supported on the upper surface of the mounting structure, above the fifth wheel.

BRIEF DESCRIPTION OF THE DRAWINGS

The features, aspects, and advantages of the present invention will become better understood with regard to the following description, appended claims, and accompanying drawings where:

DETAILED DESCRIPTION OF THE PREFERRED EMBODIMENTS

Figure 1:
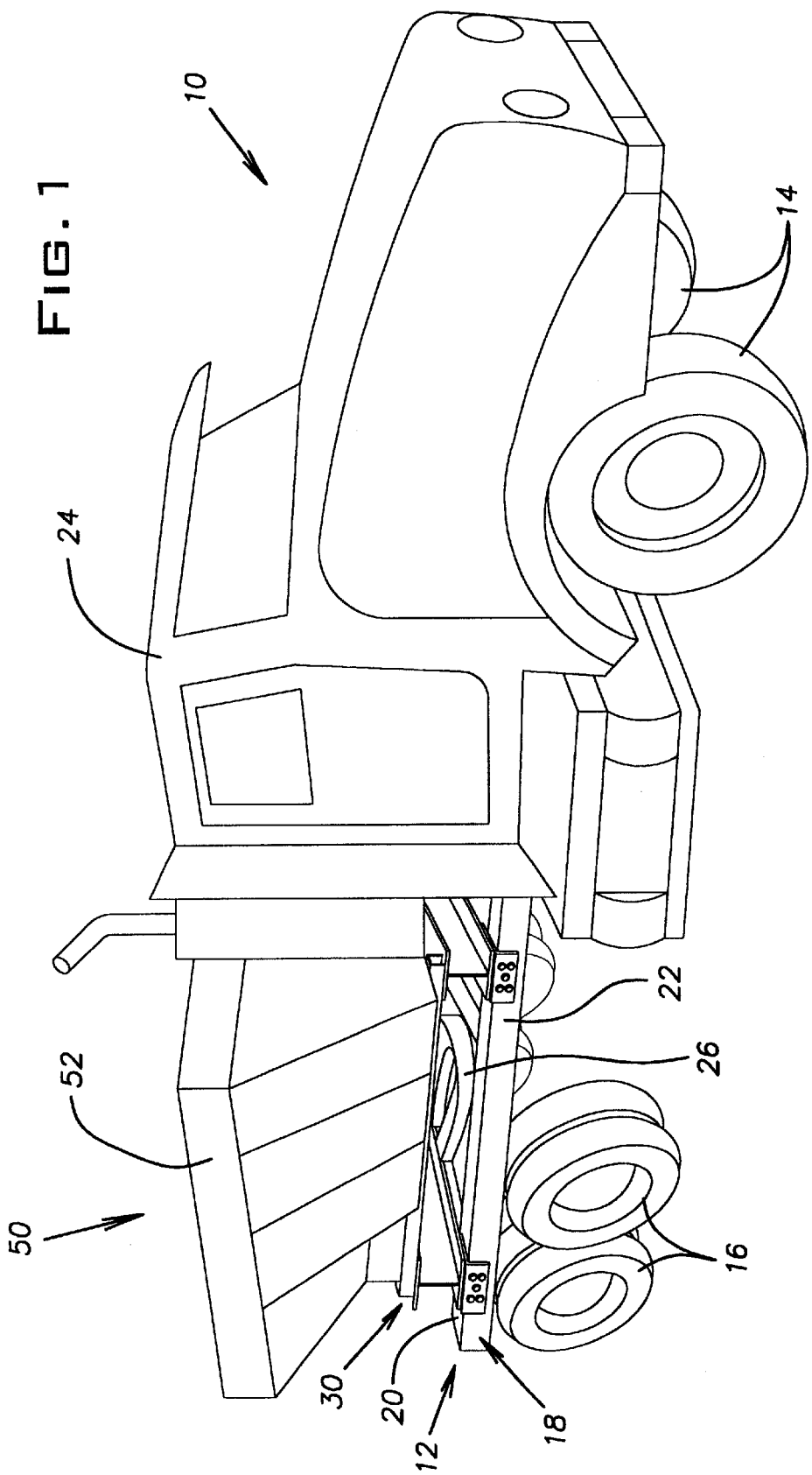
FIG. 1 shows a perspective view of a truck having a sander secured to its chassis by a mounting structure embodied in accordance with the present invention.

It should be noted that in the detailed description which follows, identical components have the same reference numerals, regardless of whether they are shown in different embodiments of the present invention. It should also be noted that in order to clearly and concisely disclose the present invention, the drawings may not necessarily be to scale and certain features of the invention may be shown in somewhat schematic form.

Referring now to FIG. 1 there is shown a perspective view of a truck 10 having a chassis 12 supported on front and rear wheels 14, 16 respectively mounted to a front axle (not shown) and a pair of rear axles (not shown). The chassis 12 includes a pair of spaced-apart chassis beams 18, each having a top wall 20 and an inner wall (not shown) and an outer wall 22. A cab 24 for housing a driver is mounted on the chassis 12 between the front and rear wheels 14, 16. An engine (not shown) for powering the truck 10 is mounted to the chassis 12, forward of the cab 24. A fifth wheel 26 is mounted to the chassis 12 so as to be disposed above the rear wheels 16. A mounting structure 30 embodied in accordance with the present invention is mounted to the chassis 12 of the truck 10.

Figure 2:
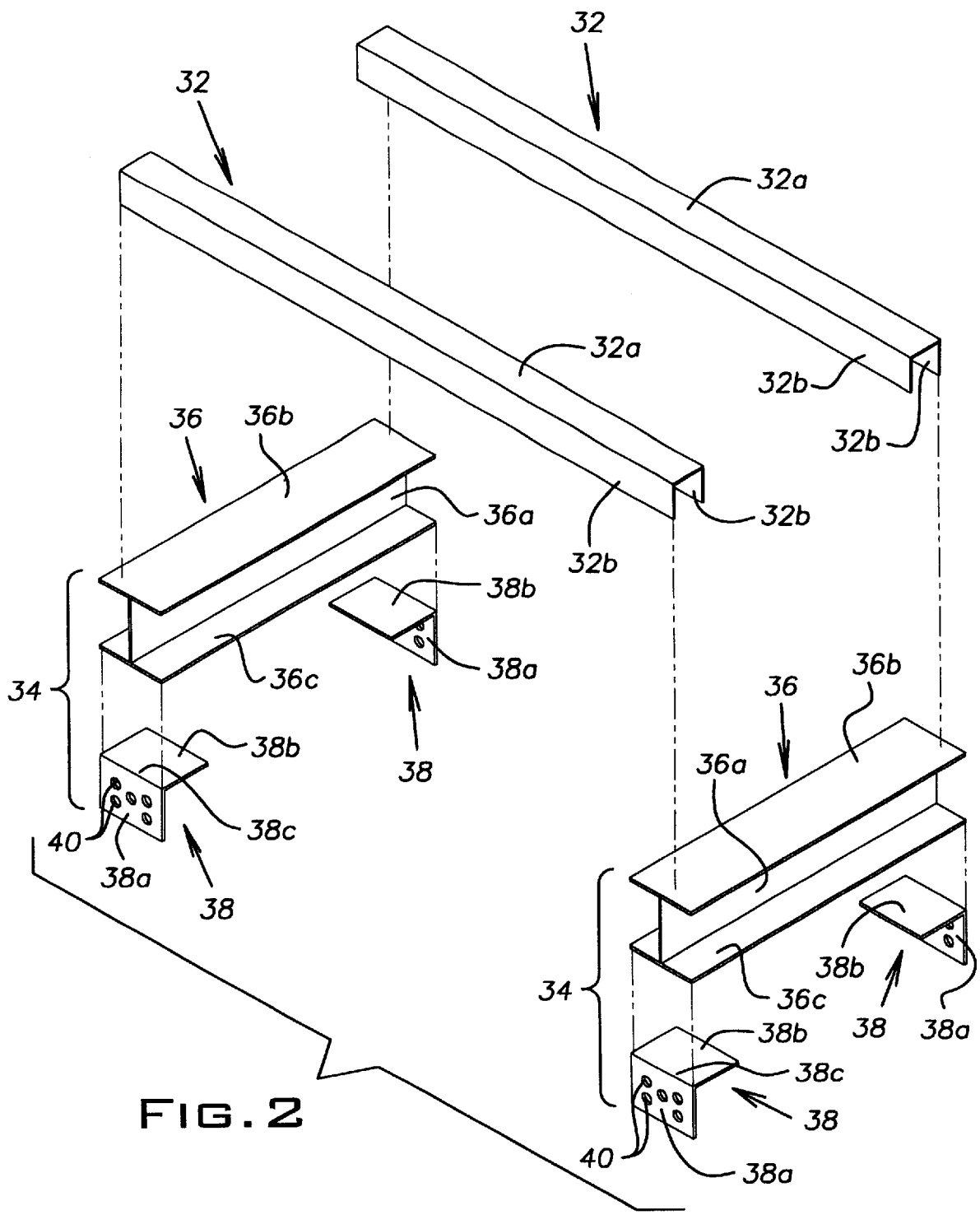
FIG. 2 shows an exploded view of the mounting structure.

Referring now to FIG. 2 there is shown an exploded view of the mounting structure 30. The mounting structure 30 includes a pair of elongated bars 32 extending between a pair of brackets 34. Each of the brackets 34 includes a center girder or I-beam 36 secured between a pair of mounting plates 38.

Preferably, each of the girders 36 is composed of steel or iron and has a center member 36a joined at substantially right angles between top and bottom members 36b, 36c, thereby providing the girders 36 with I-shaped cross-sections. Each of the girders 36 has a height in the direction of the center member 36a that is at least as high as the fifth wheel 26, and has a length that traverses the width of the chassis 12. More preferably, each of the girders 36 has a height greater than the fifth wheel 26. Thus, the length of the girders 36 is dependent upon the dimensions of the particular truck to which the mounting structure 30 is to be mounted, and the height of the girders is dependent upon the height of the fifth wheel 26. Typically, the height of each of the girders 36 is about 8 inches, and the length of each of the girders 36 is about 36 inches.

Each of the mounting plates 38 is substantially L-shaped and is preferably composed of steel or iron. The mounting plates 38 are each bent at a substantially right angle to form an attachment portion 38a joined to a support portion 38b at a bend 38c. Preferably, the attachment portion 38a and the support portion 38b each have a width in the direction of the bend 38c of about 8 inches, a length of about 6 inches, and a thickness of about 0.5 inches. In each of the brackets 34, the support portions 38b of the mounting plates 38 are secured to opposing end portions of bottom member 36c of the girder 36 by welding, or other means such as bolts.

A plurality of holes 40 are formed in the attachment portion 38a of each mounting plate 38. The holes 40 are oriented to correspond to openings extending through the outer walls 22 of the chassis beams 18 of the truck 10. Typically, the positions of openings in a chassis vary between the different makes of trucks. Accordingly, the holes 40 are typically formed in the attachment portions 38a to specifically correspond to the openings for a particular make of truck. In this regard, it should be noted that the orientation and number of the holes 40 may vary among the attachment portions 38a depending on the positions of the openings in the chassis 12. Thus, by way of example, in one of the brackets 14, the attachment portion 38a of a front one of the mounting plates 38 may have two holes 40 that are centrally located, whereas the attachment portion 38a of a rear one of the mounting plates 38 may have four holes 40 that are off-center. Preferably, each attachment portion 38a has at least two holes 40.

Preferably, the bars 32 are composed of steel or iron and are channel-shaped, having a central member 32a joined between a pair of downwardly-extending side members 32b. Each of the bars 32 has a length that is greater than the length of the fifth wheel 26 in the longitudinal direction of the chassis 12. Thus, the length of the bars 32 is dependent to an extent upon the length of the fifth wheel 26.

Each of the bars 32 has an end portion secured to an end portion of the top member 36b of one of the girders 36, and an opposing end portion secured to an end portion of the top member 36b of the other one of the girders 36. The bars 32 may be secured to the girders 36 by welding ends of the side members 32b to the top members 36b, or by securing the central members 32a to the girders 36 using bolts. The bars 32 are secured to the girders 36 at substantially right angles.

With the mounting structure 30 constructed in the foregoing manner, the mounting structure 30 forms a substantially rectangular frame having an open interior, wherein the frame is adapted to extend around and above the fifth wheel 26.

Figure 3:
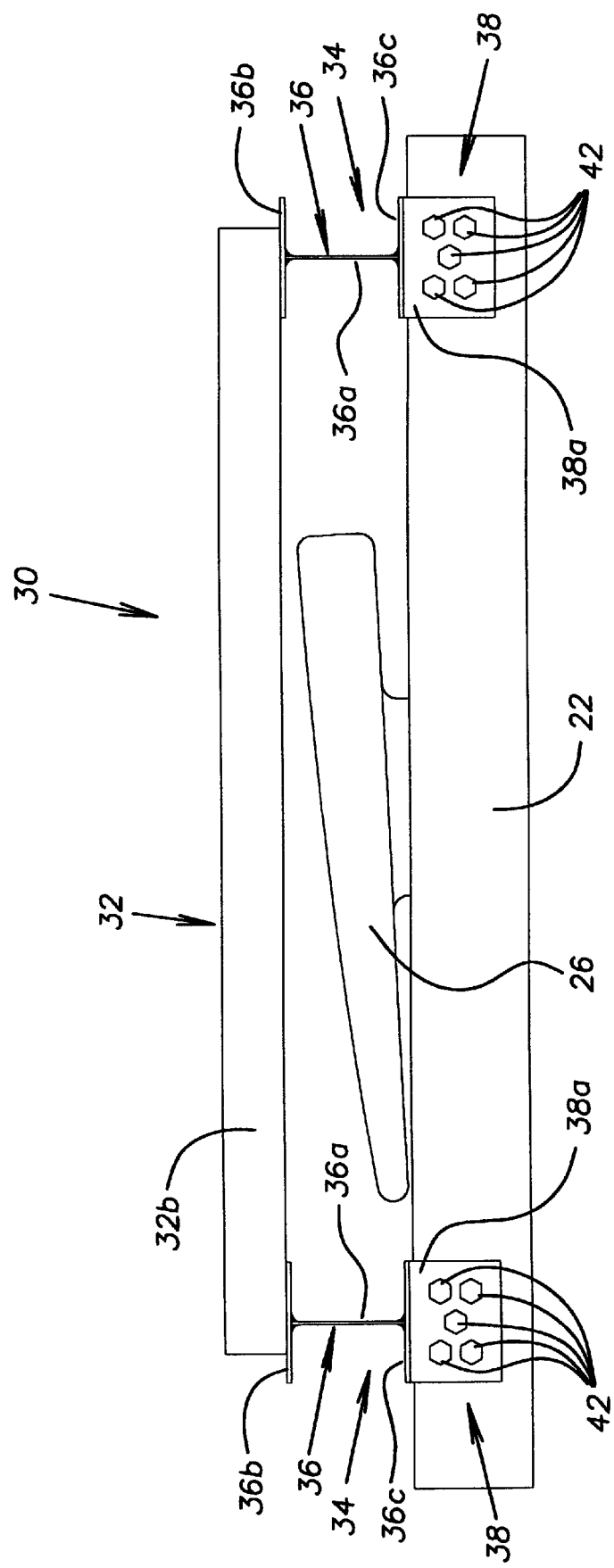
FIG. 3 shows a side view of the mounting structure secured to the chassis of the truck.

Referring back to FIG. 1 and now also to FIG. 3, the mounting structure 30 is shown mounted to the chassis 12 of the truck 10. The mounting structure 30 is mounted to the truck 10 by first disposing the mounting structure 30 above the fifth wheel 26 such that the open interior is aligned with the fifth wheel 26. The mounting structure 30 is then lowered until interior or lower surfaces of the support portions 38b of the mounting plates 38 rest against the top walls 20 of the chassis beams 18. As the mounting structure 30 is being lowered onto the chassis beams 18 or subsequent thereto, the mounting structure 30 is positioned to align the holes 40 with the openings in the outer walls 22 of the chassis beams 18 of the truck 10. Once the mounting structure 30 is resting on the chassis 12 with the holes 40 and openings aligned, bolts 42 are inserted through the aligned holes 40 and openings, and nuts are threadably secured to the free ends of the bolts 42, thereby securing the mounting structure 30 to the chassis 12 of the truck 10.

When the mounting structure 30 is secured to the chassis 12 as described above, the fifth wheel 26 is disposed between the brackets 34 in the longitudinal direction of the chassis 12, and is disposed below and between the bars 32 in the width direction of the chassis 12. Thus, the mounting structure 30 surrounds the fifth wheel 26 along the length and width of the fifth wheel 26, and outer surfaces of the central members 32a of the bars 32 are disposed above the top of the fifth wheel 26. In this manner, the outer surfaces of the central members 32a provide upper surfaces upon which a device, such as a flat bed, an enclosure, or a piece of equipment may be supported above the fifth wheel 26.

It should be appreciated that the mounting structure 30 could be modified to eliminate the bars 32, or to replace the bars 32 with a flat plate. With the bars 32 eliminated, outer surfaces of the top members 36b of the girders 36 would provide upper surfaces upon which a device may be supported above the fifth wheel 26. With the bars 32 replaced with a flat plate, an outer surface of the plate would provide an upper surface upon which a device may be supported above the fifth wheel 26. It is preferred, however, that the bars 32 be utilized as described above.

In FIG. 1, a sander 50 is shown supported on the outer surfaces of the central members 32a. Bottom portions of the sander 50 are secured to the central members 32a of the bars 32 by nuts and bolts, or other fastening means. The sander 50 includes a box or hopper 52 with an open top for holding a load of salt or sand. A spreader (not shown) is connected to a bottom opening (not shown) in the hopper 52, and is positioned to the rear of the hopper 52, at the back of the truck 10. The spreader is operable to receive sand or salt from the hopper 52 and distribute the same over a roadway or other area upon which the truck 10 is travelling. In this manner, the mounting structure 30 permits the truck 10 to be used as a sand or salt spreader, such as during the winter.

As described above, the mounting structure 30 permits the truck 10 to be modified to carry a device, such as a sander, thereby increasing the efficiency with which the truck 10 may be used. In accordance with the method of the present invention, a structure (such as the mounting structure 30) is provided having at least one upper surface (such as the outer surfaces of the central members 32a) and a pair of brackets (such as the brackets 34). Preferably, a pair of elongated members (such as the bars 32) that include the upper surface are secured between the brackets to form a frame. A device to be carried by the truck is also provided. The device may be a flat bed, an enclosure or a piece of equipment (such as the sander 50). The mounting structure is secured to the chassis of the truck 10 such that the fifth wheel 26 is disposed between the brackets, and the upper surface is disposed at least as high as the top of the fifth wheel 26. Preferably, the upper surface is disposed above the fifth wheel 26. The device is then placed on the mounting structure such that the device is at least partially supported on the upper surface of the mounting structure, above the fifth wheel 26. The device may be secured to the mounting structure by fastening means such as nuts and bolts.

Although the preferred embodiments of this invention have been shown and described, it should be understood that various modifications and rearrangements of the parts may be resorted to without departing from the scope of the invention as disclosed and claimed herein. Also, it is noted that the device according to the present invention is adapted for use in spreading or distributing numerous materials, typically granular, including agricultural lime, agricultural fertilizer, and earth, in addition to the sand and salt described hereinbefore.

What is claimed is:

1. A mounting structure for supporting a device above a fifth wheel on a chassis of a truck, said chassis extending rearwardly from a cab of said truck and having a longitudinal direction, said mounting structure comprising:

a first bracket and a second bracket, each of said brackets including a girder and first and second mounting plates, said girders having a first end and a second end and extending in a direction transverse to said chassis longitudinal direction, said first mounting plate being secured to said girder first end and said second mounting plate being secured to said girder second end, said mounting plates each having an attachment portion extending at a substantially right angle from the girder, and being adapted for mounting to opposing side walls of the chassis, said girders each having a height at least as high as the fifth wheel; and a pair of bars, each of said bars having an end portion secured to the first bracket girder and an opposing end portion secured to the second bracket girder, said bars being secured to the brackets such that the brackets and the bars form a frame adapted to extend around and above the fifth wheel.

2. The mounting structure of claim 1, wherein the bars each have a length greater than the length of the fifth wheel in the longitudinal direction of the chassis.

3. The mounting structure of claim 1, wherein the frame is substantially rectangular.

4. The mounting structure of claim 1, wherein the mounting plates are L-shaped.

5. The mounting structure of claim 1, wherein the bars are channel-shaped.

6. A truck comprising:

a chassis a cab mounted to the chassis;

a fifth wheel mounted to the chassis, rearward of the cab;

a mounting structure secured to the chassis, said mounting structure having an upper surface disposed at least as high as the top of the fifth wheel, and a pair of brackets disposed on opposing sides of the fifth wheel such that one of said pair of brackets is disposed relatively between said cab and said fifth wheel and the other of said pair of brackets is disposed rearwardly of said fifth wheel; and a device at least partially supported on the upper surface of the mounting structure, above the fifth wheel;

wherein the brackets of the mounting structure each include a pair of mounting plates secured to opposing end portions of a girder, said mounting plates each having an attachment portion extending at a substantially right angle from the girder, said attachment portions being secured to opposing side walls of the chassis.

7. The truck of claim 6, wherein the girders each have a height at least as high as the fifth wheel.

8. The truck of claim 6, wherein the mounting structure further comprises a pair of bars, each having an end portion secured to the girder of one of the brackets and an opposing end portion secured to the girder of the other one of the brackets.

9. The chassis of claim 8, wherein the bars include the upper surface upon which the device is supported above the fifth wheel.

10. The truck of claim 8, wherein the bars are secured to the brackets such that the brackets and the bars form a frame adapted to extend around and above the fifth wheel.

11. The mounting structure of claim 10, wherein the frame is substantially rectangular.

12. The mounting structure of claim 10, wherein the device is a spreader having a hopper for holding a granular material.

13. A method of modifying a truck having a chassis with a fifth wheel mounted thereto, said chassis having a length direction and said fifth wheel being disposed on said chassis rearwardly of a cab of said truck, said method comprising the steps of:

providing a mounting structure having an upper surface and a pair of brackets;

providing a device to be carried by the truck;

securing the mounting structure to the chassis of the truck such that one of the brackets is disposed between the fifth wheel and the cab of the truck and the other of the brackets is disposed rearwardly of said fifth wheel, said brackets extending transverse to the length direction, and the upper surface is disposed at least as high as the top of the fifth wheel; and placing the device on the mounting structure such that the device is at least partially supported on the upper surface of the mounting structure, above the fifth wheel.

14. The method of claim 13, further comprising the step of securing the device to the mounting structure.

15. The mounting structure of claim 13, wherein the device is a spreader having a hopper for holding a granular material.

16. The method of claim 13, wherein the brackets of the mounting structure each include a pair of mounting plates secured to opposing end portions of a girder, said mounting-plates each having an attachment portion extending at a substantially right angle from the girder.

17. The method of claim 16, wherein the mounting structure further comprises a pair of bars, each having an end portion secured to the girder of one of the brackets and an opposing end portion secured to the girder of the other one of the brackets.

18. The chassis of claim 17, wherein the bars include the upper surface upon which the device is supported above the fifth wheel.

* * * * *